(No Model.)

E. MORRISON & J. P. HERRON.
THICKNESS GAGE.

No. 292,131. Patented Jan. 15, 1884.

Witnesses:
L. C. Hills
Ja. Callahan

Inventors.
E. Morrison
and
J. P. Herron
By E. B. Stocking
Atty.

UNITED STATES PATENT OFFICE.

EBENEZER MORRISON AND JAMES P. HERRON, OF WASHINGTON, D. C.

THICKNESS-GAGE.

SPECIFICATION forming part of Letters Patent No. 292,131, dated January 15, 1884.

Application filed October 13, 1883. (No model.)

*To all whom it may concern:*

Be it known that we, EBENEZER MORRISON and JAMES P. HERRON, citizens of the United States, residing at Washington, District of Columbia, have invented certain new and useful Improvements in Thickness - Gages, of which the following is a specification, reference being had therein to the accompanying drawings, in which—

Figure 1:
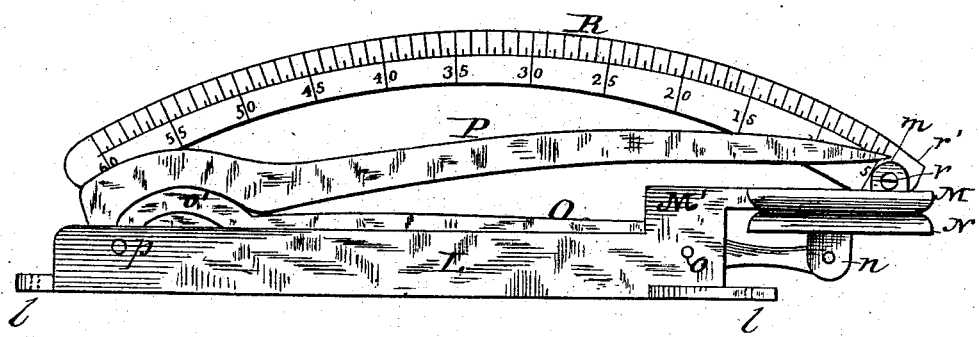
Figure 3:
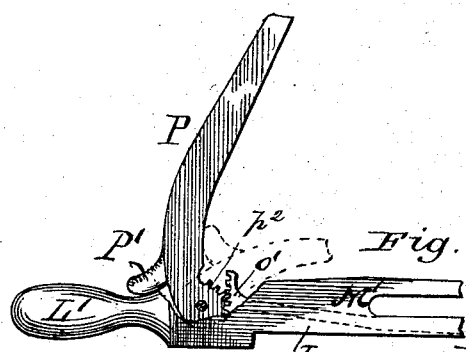
Figure 2:
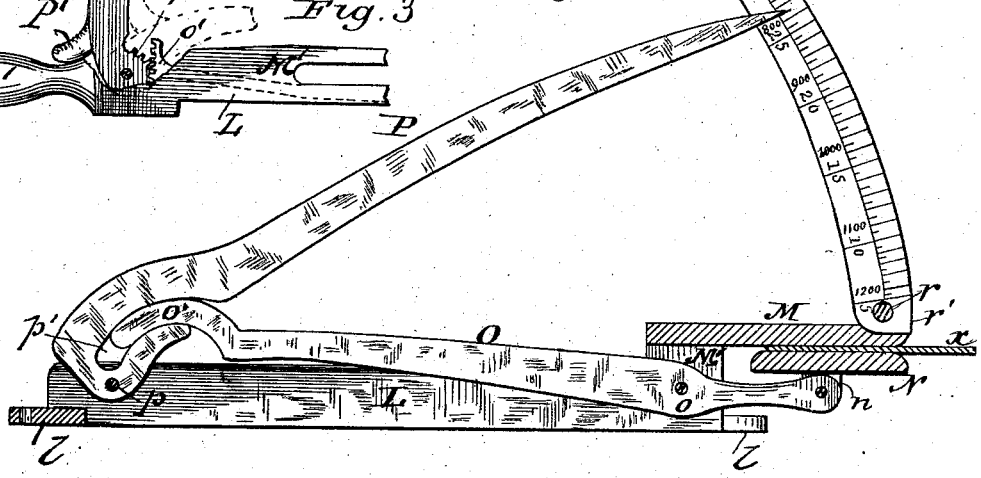

Figure 1 is a side elevation of a thickness-gage constructed in accordance with our invention. The scale-beam in this illustration is shown as folded or closed. Fig. 2 is a similar view, partly in section, with the scale-beam elevated. Fig. 3 is a modification hereinafter described.

Like letters refer to like parts in all the figures.

The invention herein claimed is shown and described in another application now pending, Serial No. 104,769, filed by us August 25, 1883, of which application this is a division.

The purpose of this invention is to provide means for the accurate measurement of the thickness of fabrics; and in the above-mentioned application this gage forms a part of an apparatus for testing the strength of fabrics; but, as therein stated, it is adapted for use independently of said apparatus. The gage herein shown may be used for measuring the thickness of cords, wire, leather, cloth, paper, or any other substances, and it may be constructed so as to be secured to any suitable base, or as shown in Fig. 3, so as to be held in the hand of the user.

The base L is cut away or slotted to form a step, M', which step is extended to form a fixed jaw, M, and is slotted vertically for the support and operation therein of a lever, O, pivoted to the base at $o$, and provided at one end with means for the pivotal connection therewith of a movable jaw, N, which in this instance is provided with a perforated depending lug, $n$. At the opposite end of the lever O is a curved portion, $o'$, adapted to fit a similarly-curved slot, $p'$, formed at the end of a pointer, P, pivoted in the vertical slot of the base at $p$. The scale-beam is a sector, R, pivoted at $r$ in a lug, $m$, formed on the fixed jaw M, and provided with a stop, $r'$, which acts to determine the position of the scale-beam when elevated by striking against a surface of the fixed jaw. Perforated extensions $l$ are formed upon the base L, for the purpose of adapting it to be secured to a suitable foundation. As shown in Fig. 3, these extensions are omitted, and a handle, L', is formed on that end of the base L which is opposite the jaws M N. The pointer P is provided with a thumb-piece, P', and the curved portion $o'$ of the lever O is in the form of a toothed segment, and the pivoted end of the pointer P is made in the form of a pinion, $p^2$, as clearly shown.

The operation of the gage is as follows: By introducing any fabric, as $x$, Fig. 2, between the jaws M N, the curved end $o'$ of the lever O is elevated and moves the pointer along the scale-beam R. In this instance the beam is marked in degrees of a circle, and also in numbers indicating the number of sheets to the inch—that is to say, the indicated number will be required of sheets, each of a thickness of the one between the jaws, when such number is so indicated, to produce a pile or block of said sheets measuring one inch in thickness. By this scale we provide a new means of indicating different grades of paper in a class, and the designation of any sample of a class is instantly indicated when tested by our gage. No calculation is required, but by simply gaging the thickness of the sample a quantity may be ordered and the grade designated by the use of the terms "one," "two" "three," or "hundred" to the inch or fractions thereof, as the case may be. So in like manner may the degree-scale be used; but as the degrees differ in proportion to the lengths of pointers in differently-constructed gages, the sheet-to-the-inch scale must be so laid out that relatively to the degree-scale it may differ in different instruments, but is required to be the same, *per se*, in all gages—that is to say, an eleven-hundred sheet may not always indicate ten degrees upon the scale of all thickness-gages which employ a degree-scale. We therefore do not limit ourselves to the exact relative scales, degree, and sheet herein shown.

It is advantageous at times—as, for example, in gaging paper in a machine during the process of its manufacture—to apply the gage to the paper so as to control the uniformity of the grade of paper being produced by the machine. For this purpose and to adapt the gage to be used by hand, the handle L' is grasped in one hand the thumb of which is placed upon the projection P', and by depressing it the jaws M N are separated, the sample inserted between them, and the pointer is then allowed to drop by the removal of the thumb from the projection, and it will instantly indicate the degree and sheet measurement of the sample.

As clearly shown in Fig. 1, the scale-beam is adapted to be folded down, whereby the instrument is made to occupy less space, for convenience in storage or transportation.

We do not limit ourselves to the exact construction and relative proportion of the parts herein shown, but may change the same to any extent and in any manner within the skill of persons conversant in the construction of instruments of this kind.

One of the practical advantages of our gage is that the weight per ream of any paper, the size of the sheet being known, may be instantly determined by the indications made on the scale-beam when a piece of said grade of paper is between the jaws of the gage.

In the trade it often occurs that parties order paper in quantity and send or submit a piece of the grade desired, such piece being a slight portion of a sheet the size of which is usually given with the order. For example, let the sample be a piece three inches square of 24x36 manila. The question to be determined is the ream weight of paper of that size and thickness. As paper is manufactured at the present day, there is more or less variation in the thickness of the sheets in every ream—that is to say, one may take, for instance, a ream of twenty-pound 24x36 manila and cull therefrom sheets which, if a number thereof should be collected sufficient to form one ream, would weigh, it might be, as low as eighteen pounds. Other sheets so culled and collected might weigh more than twenty pounds. Taking the general average of twenty-pound paper, we establish an average thickness per sheet for that size, and when a sample gages said average thickness we at once know the weight per ream. So, also, if the weight be given, we may ascertain the size required of paper like the sample, which shall be the desired weight.

Having described our invention and its operation, what we claim is—

1. In a thickness-gage for measuring paper, a scale indicating degrees and sheets to the inch, substantially as specified.

2. In a thickness-gage, a fixed jaw having a degree-scale mounted thereon and a movable jaw mounted upon a lever, the free end of which is curved and directly connected to a pointer between its pivot and the said scale, the whole being constructed and operating substantially as specified.

3. In a thickness-gage, the combination of a lever supporting one of the jaws, and connected with a pointer having a thumb-piece, and a base provided with a handle, substantially as specified.

4. In a thickness-gage, the combination of a base provided with a handle, and a pointer provided with a thumb-piece, substantially as specified.

5. The combination of a base provided with a fixed jaw and with a handle of a lever carrying a movable jaw and provided with a toothed curved free end, with a pointer provided with meshing teeth and a thumb-piece, substantially as specified.

6. In a thickness-gage, the combination of the fixed jaw M, the movable jaw N, and the lever O, pivoted to a step or extension, M', of the fixed jaw, substantially as shown and described.

7. The combination of the lever O, having the curved portion o', with the pointer P, having a similarly-curved slot, p', and the base L, having the pivots o p and the extensions l, substantially as shown and described.

8. In a thickness-gage, the combination of the fixed jaw M, provided with the lug m, and the sector scale-beam R, provided with the stop r', substantially as shown and described.

9. The combination of the pivoted scale-beam R, the pivoted and curved slotted pointer P, the curved lever O, the base L, and the jaws M N, substantially as shown and described.

In testimony whereof we affix our signatures in presence of two witnesses.

EBENEZER MORRISON.
JAMES P. HERRON.

Witnesses:
E. B. STOCKING,
M. P. CALLAN.